United States Patent [19]

Ostermann

[11] Patent Number: 5,496,075
[45] Date of Patent: Mar. 5, 1996

[54] ROTATIVE JOINT APPLICABLE IN PNEUMATIC AIR PRESSURE CONTROL ASSEMBLY

[75] Inventor: Juergen W. Ostermann, Sao Paulo, Brazil

[73] Assignee: VDO Kienzle Comercio E Servicos Ltda., Sao Paulo, Brazil

[21] Appl. No.: 418,504

[22] Filed: Apr. 7, 1995

[51] Int. Cl.$^6$ .................................................. F16L 3/00
[52] U.S. Cl. ............................ 285/62; 285/190; 285/276; 285/321; 285/330
[58] Field of Search .................................... 285/276, 274, 285/190, 61, 62, 63, 64, 272, 275, 277, 278, 279, 280, 281, 282, 98, 321

[56] References Cited

U.S. PATENT DOCUMENTS

| | | | |
|---|---|---|---|
| 2,384,360 | 9/1945 | Allen et al. | 285/276 X |
| 2,752,197 | 6/1956 | Marco | 285/190 X |
| 2,873,810 | 2/1959 | Orton | 285/190 X |
| 3,889,983 | 6/1975 | Freize et al. | 285/276 X |
| 4,296,952 | 10/1981 | McCracken | 285/276 X |
| 4,577,892 | 3/1986 | Wrulich et al. | 285/190 X |
| 4,817,995 | 4/1989 | Deublen et al. | 285/276 X |
| 5,165,734 | 11/1992 | Smith | 285/276 |
| 5,303,959 | 4/1994 | Medsker | 285/276 X |

*Primary Examiner*—Dave W. Arola
*Attorney, Agent, or Firm*—Steinberg, Raskin & Davidson

[57] ABSTRACT

A rotative joint for a pneumatic air pressure control assembly having a body having at least one air outlet, an externally, threaded projection and a set nut arranged thereon to fix the assembly to a shaft end of a vehicle, and a kinematic shaft coaxially and internally disposed in the body and which is supported in a pair of bearings that enable relative motion between the shaft and the body. The shaft is positioned by a conventional set collar and elastic ring and is hollow for allowing pneumatic connection between an inlet defined in its external end and the air outlets of the body. The body further includes an internal air chamber aligned with the air outlets and disposed between a bottom wall of the body and the internal end of the kinematic shaft, and pneumatic sealing structure provided in the air chamber for assuring air pressurization through the air outlets. The pneumatic sealing is achieved by a sealing element obtained by a material with low friction properties and high resistance to the wear.

10 Claims, 2 Drawing Sheets

ROTATIVE JOINT APPLICABLE IN PNEUMATIC AIR PRESSURE CONTROL ASSEMBLY

BACKGROUND OF THE INVENTION

The present invention relates to a rotative joint for a pneumatic air pressure control assembly which distributes air pressure supplied therethrough to pneumatic elements of a vehicle, particularly in the case of trucks and the like, in order to calibrate the air pressure with a predetermined value. The inventive rotative joint provides an improved sealing system with a high durability and which is very practical.

As known in the prior art, and particularly by users of pneumatic air pressure control assemblies, such an assembly has various problems relating to the sealing system of the rotative joint that constitutes part of the air pressure control assembly. These problems directly result from the durability and efficiency of the internal sealing system, and from the utilization of inadequate sealing elements, e.g., rubber rings with a metallic band or core which are unable to support a constant and dynamic contact between the parts to be sealed. The elements are exposed to the action of high temperatures caused by the absorbed dynamic friction.

The above-described functional incompatibility causes the rotative joint to be unable to achieve its specific, intended functions and detrimentally affects the operation of the air pressure control assembly as a whole.

OBJECTS AND SUMMARY OF THE INVENTION

It is an object of the present invention to provide a rotative joint applicable in a pneumatic air pressure control assembly capable of substantially eliminating the above-mentioned problems.

It is another object of the present invention to provide a rotative joint applicable in a pneumatic air pressure control assembly which provides an internal sealing system with a high resistance to the mechanical wear occurred from continuous dynamic contact between the parts to be sealed.

It is still another object of the present invention to provide a rotative joint applicable in a pneumatic air pressure control assembly which provides an internal sealing system that is resistant to high temperatures resulting in an improvement of the useful life of the system and, consequently, of the air pressure control system as a unit.

In order to accomplish these objects, and others, the rotative joint in accordance with the invention comprises a substantially cylindrical, tubular body which is fixed to a shaft provided on a vehicle and which has an air input in pneumatic communication with the pneumatic systems of the vehicle to thereby control air pressure, and an air output in pneumatic communication with an air vessel or chamber of the vehicle. The body is internally provided with a kinematic shaft which is pneumatically sealed to assure displacement between both the air input and output of the rotative joint as well as pneumatic communication between the same.

In accordance with the present invention, the rotative joint provides a pneumatic sealing between the kinematic shaft and the body, a tubular sealing element with low friction properties and high dynamic resistance and which is coaxially disposed between an internal end of the kinematic shaft and an internal stop of the tubular element.

The rotative joint for a pneumatic air pressure control assembly for a vehicle in accordance with the invention includes a body disposed along a substantially longitudinal axis and having at least one air outlet and an interior cavity, means arranged on the body for fixing the body to the vehicle, an elongate shaft having a first end situated in the body interior and a second end opposed to the first end situated exterior to the body, and bearing means for supporting the shaft in the body while allowing relative rotational motion between the shaft and the body about their common central axis. The shaft has an air inlet opening situated exterior to the body and a hollow interior into which the air inlet opening leads. The body defines an air chamber in its interior which provides air communication between the hollow interior of the shaft and the at least one air outlet of the body. The body has pneumatic sealing means arranged therein for sealing the air chamber. The sealing means comprises a material having low friction properties and high resistance to wear. Preferably, the sealing means comprise a substantially tubular sealing element having an external edge which is positionable in contact with the first end of the shaft and includes a web so that the sealing element engages and is fixed in an oblong chamfer thereby preventing rotation of the sealing element with the motion of the shaft. The sealing elements may include a rear end portion positionable in the air chamber and having an external diameter which is smaller than an internal diameter of the air chamber. Moreover, the rear end portion may include a circumferential channel in an outer face thereof whereby the sealing means further comprises an O-ring embedded in the channel. The tubular sealing element has an axis which coincides with the axis of the shaft and the axis of the body, i.e., is coaxial thereto.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
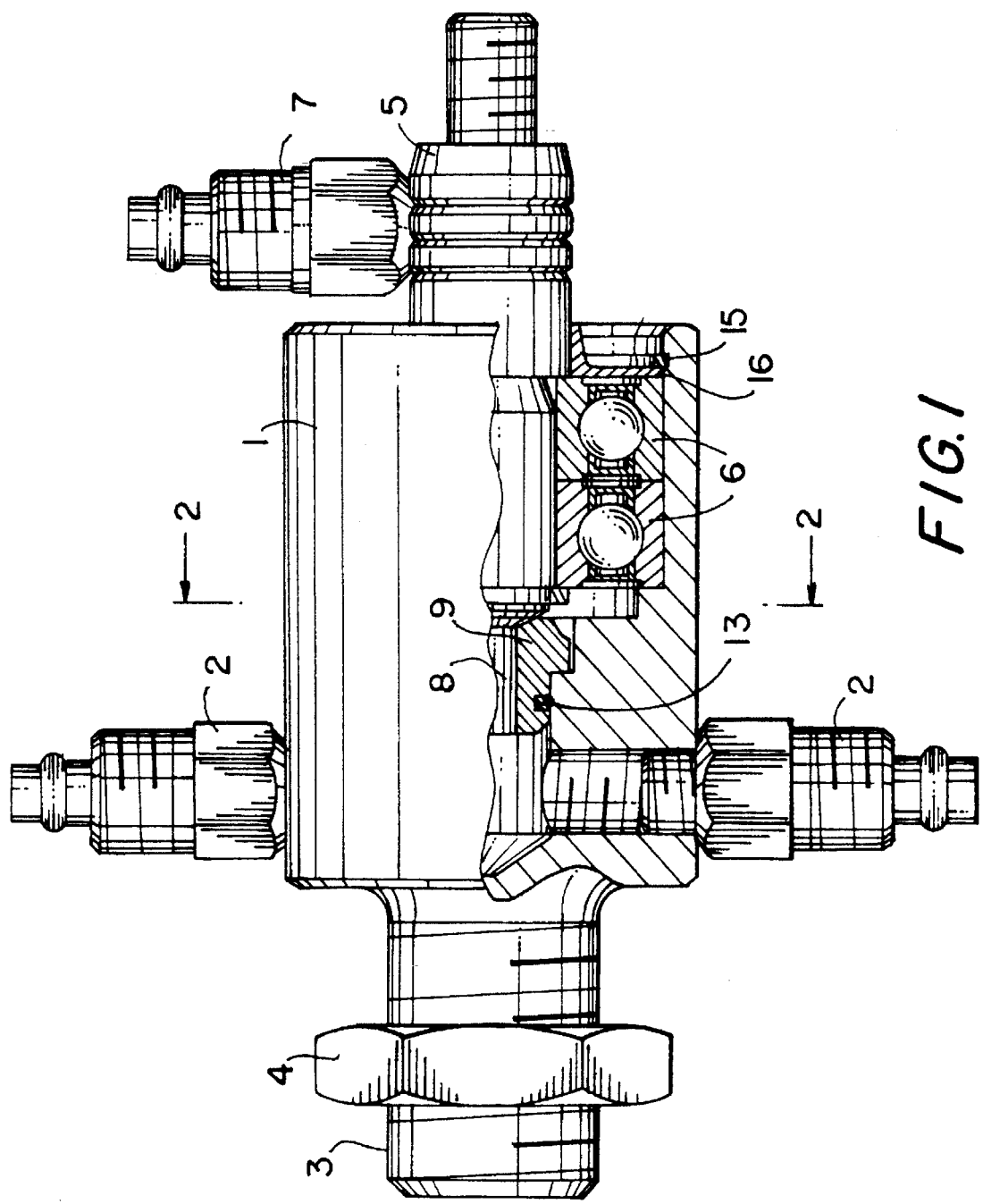
FIG. 1 shows a partial view of a rotative joint in accordance with the invention.

Referring to the drawings wherein like reference numerals refer to the same or similar elements, the rotative joint applicable in pneumatic air pressure control assembly in accordance with the invention comprises a substantially, cylindrical tubular body 1 extending along a longitudinal axis and having at least one air outlet 2 in proximity to an end thereof. In the illustrated embodiment in FIG. 1, there are two air outlets 2 extending radially from the body 1. For fixing the joint to a vehicle or other structure, there is an externally threaded projection 3 projecting from one end of the body 1 and a set nut 4 arranged thereon around the threads of projection 3 for fixing the threaded projection 3 in the shaft end of the vehicle (not shown).

The body 1 is coaxially and internally provided with an elongate, kinematic shaft 5 supported on a pair of thrust ball bearings 6, i.e., the central axis of shaft 5 substantially coincides with the longitudinal axis of the body 1. The shaft 5 extends through an open end of the body opposite to the end having the projection 3 and set nut 4 such that one end of the shaft 5 is situated in an interior of the body 1 and an opposite end of the shaft 5 is situated exterior to the body 1. The ball bearings 6 are arranged on a surface defining the body interior and enable relative motion between the shaft 5 and the body 1. The shaft 5 is positioned in a desired location in the body 1 by a conventional set ring collar 16 and an elastic ring 15 arranged around the shaft 5 or other suitable positioning means.

The shaft 5 has a hollow interior and has an air inlet member 7 extending therefrom at the external end of shaft 5 which is situated exterior of the body 1. The inlet member 7 leads into the hollow interior of shaft 5 to allow a pneumatic connection between the air inlet 7 and the air outlets 2 of the body 1.

The body 1 also comprise an air vessel or chamber 8 in its interior which is aligned with the air outlets 2 and arranged between a bottom wall of the body 1 which defines the interior space and the internal end of the kinematic shaft 5, i.e., the end which extends into the body 1. The air chamber 8 has a pneumatic seal that assures an air pressurization from the radial air outlets 2. The pneumatic sealing between the air vessel 8 and the internal end of the kinematic shaft is achieved by sealing means, e.g., element 9, made from a material with low friction properties and having a high resistance to wear.

Figure 3:
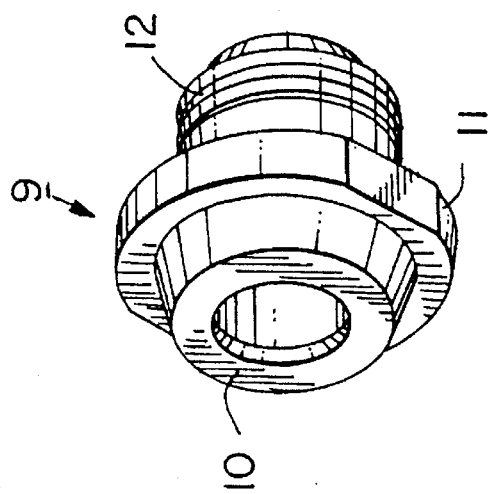
FIG. 3 is an amplified perspective view of the rotative joint in accordance with the invention.
Figure 2:
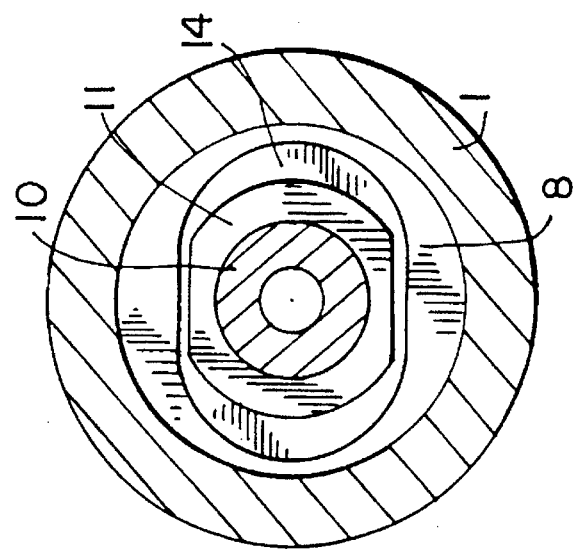
FIG. 2 is a sectional view according to line A—A of FIG. 1.

Sealing element 9 has a tubular format surrounding the air chamber 8. An external edge 10 of element 9, seen in FIG. 3, is in contact with the internal end of the kinematic shaft 5 and includes a web 11 so that the sealing element 9 engages and is fixed in an oblong chamfer 14. In this manner, the sealing element 9 is unable to rotate with the motion of the kinematic shaft 5.

Referring to FIG. 3, a rear end portion 12 of the sealing element 9 has an external diameter which is smaller than the internal diameter of the air chamber 8 of the body 1. The rear portion 12 also includes a circumferential channel in its outer face in which a sealing ring, i.e., an O-ring 13, is embedded.

The examples provided above are not meant to be exclusive. Many other variations of the present invention would be obvious to those skilled in the art, and are contemplated to be within the scope of the appended claims. For example, although the invention is described above with reference to a vehicle, the invention may be used in conjunction with other devices which use a pneumatic air pressure control assembly and require a rotative joint.

I claim:

1. Rotative joint for a pneumatic air pressure control assembly for a vehicle, comprising a body including at least one air outlet, said body having an interior and being disposed along a substantially longitudinal axis, means arranged on said body for fixing said body to the vehicle, an elongate shaft having a first end situated in said body interior and a second end opposed to said first end situated exterior to said body, said shaft being disposed along an axis coinciding with said axis of said body, bearing means for supporting said shaft in said body while allowing relative rotational movement between said shaft and said body, said shaft having an air inlet opening situated exterior to said body and a hollow interior into which said air inlet opening leads, said body defining an air chamber in its interior, said air chamber providing air communication from said hollow interior of said shaft to said at least one air outlet of said body, and pneumatic sealing means arranged in said air chamber for sealing said air chamber, said sealing means comprising a material having low friction properties and high resistance to wear.

2. The pneumatic air pressure control assembly of claim 1, wherein said sealing means comprise a substantially tubular sealing element having an external edge and a web, said external edge being positionable in contact with said first end of said shaft, said body having an oblong chamfer in which said web is positioned such that rotation of said sealing element with the movement of said shaft is prevented.

3. The pneumatic air pressure control assembly of claim 2, wherein said rear end portion includes a circumferential channel in an outer face thereof, said sealing means further comprising an O-ring embedded in said channel.

4. The pneumatic air pressure control assembly of claim 1, wherein said sealing means comprise a substantially tubular sealing element having a rear end portion, said rear end portion having an external diameter which is smaller than an internal diameter of said air chamber.

5. The pneumatic air pressure control assembly of claim 1, wherein said sealing means comprise a substantially tubular sealing element having an axis, said axis of said sealing element coinciding with the axis of said shaft and the axis of said body.

6. The pneumatic air pressure control assembly of claim 1, wherein said means on said body further for fixing said body to the vehicle comprises an externally threaded projection and a set nut for fixing said projection to the vehicle.

7. The pneumatic air pressure control assembly of claim 1, wherein said body comprises two of said air outlets extending radially from said body.

8. The pneumatic air pressure control assembly of claim 1, wherein said bearing means supporting said shaft comprise ball bearings arranged on a surface defining said body interior.

9. The pneumatic air pressure control assembly of claim 1, further comprising positioning means for positioning said bearing means and shaft in said body, said positioning means comprising a set collar and an elastic ring arranged around said shaft.

10. The pneumatic air pressure control assembly of claim 1, further comprising means for preventing rotation of said sealing element during rotational movement of said shaft relative to said body.

* * * * *